United States Patent Office 2,973,266
Patented Feb. 28, 1961

2,973,266
STABILIZATION OF FAT-SOLUBLE VITAMIN
Adolf Rosenberg, Forest Hills, N.Y.
(57 Commerce St., Brooklyn 31, N.Y.)
No Drawing. Filed Feb. 5, 1958, Ser. No. 713,312
11 Claims. (Cl. 99—2)

This invention relates to feeds or supplements of feeds fortified with the fat-soluble vitamins. More particularly, it is directed to a novel dry composition containing the fat-soluble vitamins in a highly stabilized and physiologically available form. The present application is a continuation in part of my pending application, Serial No. 365,788, filed July 2, 1953, now Patent No. 2,937,091.

The provision of means for fortifying feeds with supplements containing the fat-soluble vitamins in assured potencies is a problem which has commanded a vast amount of attention from scientists and technologists. Initially, it was thought sufficient to provide the fat-soluble vitamins for feed supplementation in such form that, until incorporation thereof in the feed, the vitamin content thereof was stabilized so as to withstand destruction or disintegration; and, further, that the feeds containing such supplements should exhibit a retention of the vitamin potency comparable to that of the supplements prior to their incorporation in the feed. However, an even greater and more perplexing problem exists with respect to providing a fat-soluble vitamin supplement that can be included as a component of mineral supplements or mineral concentrates that are now used to provide the necessary or essential trace-mineral supplementations of the basic feed rations.

I have discovered that the primary cause for the loss of fat-soluble vitamin (especially vitamin A) potency in feed supplements is due to the fact that moisture, and moisture especially in the presence of trace minerals, provides the pathway for pro-oxidants (iron, copper and manganese) to migrate into the particles containing the vitamin. This makes the vitamin very labile to oxidation.

In efforts to preserve the vitamin content of these supplements, frequently in bead form, workers in this art had taken the route of either using water-insoluble waxes and fats of very high melting point or using a water-soluble barrier material to physically separate the fat-soluble vitamin from destructing forces. I have discovered that the aforesaid water-insoluble barriers are not satisfactory in protecting the vitamin when the preparations in mineral supplements are stored under conditions of high humidity. I have also discovered that in the presence of humidity and trace minerals the water-soluble barriers (such as pectin, gelatin, and undenatured milk proteins) are virtually useless.

The disadvantages of using high melting fats and waxes to protect the fat-soluble vitamins A, D, E, and K against the destructive effects of moisture, and especially moisture in the presence of trace minerals, arise from the fact that some fat-soluble vitamin is present at the surface of the fat (or wax) particles as well as within. The exposed fat soluble vitamin at the surface lacks a barrier against destructive influences and hence becomes oxidized to initiate a chain reaction which affects the vitamin even within the center of the fat particle. Furthermore, fats and waxes of very high melting point selected for greater resistance per se to oxidative deterioration can interfere with the biological availability of the fat-soluble vitamin dissolved therein.

The idea came to me that the answer to the perplexing problem of protecting the fat-soluble vitamins and, at the same time using digestible protecting agents, is in the encapsulation of the fat-soluble vitamin in a digestible fatty vehicle and then surrounding beads thereof with a shell of water-resistant, irreversibly heat-denatured proteinaceous material. The latter shell is also fat-insoluble. Thus, there can be no fat or fat-soluble vitamin in the outer shell. The irreversibly heat-denatured proteinaceous material is water-resistant, and thus provides a barrier against moisture, and particularly against moisture containing dissolved trace minerals, so that migration of the pro-oxidants to the outer surface of the inner fat bead is greatly retarded. Careful experimentation has supported the validity of my hypothesis. The water-resistant irreversibly heat-denatured proteinaceous barrier is digestible in vivo in consequence of the proteolytic action of the enzymes in the digestive tract.

It is thus an object of the present invention to provide the feed industry with dry, discrete beads containing stabilized fat-soluble vitamin in a fatty core which is encased in a irreversibly heat-denatured, water-resistant proteinaceous digestible shell.

It is a further object to provide mineral mixtures containing such stabilized fat-soluble vitamin beads, said mineral mixtures no longer provoking the rapid disintegration of the fat-soluble vitamin during storage of the mixture under humid conditions.

An additional object is to provide a process for the manufacture on a commercial scale of dry, discrete beads containing stabilized fat-soluble vitamin in a fatty core which is encased in a heat-denatured, water-resistant proteinaceous digestible shell, as aforesaid.

It is recognized that encapsulation of labile vitamins in the form of pharmaceutical tablets or capsules is old in the art. Such products are, however, unsuited for use as feed supplements since one animal or bird in one feeding might obtain a super dose of the vitamin at the expense of that allocated to all the animals or birds receiving the feeding with the vitamin supplement. This makes it mandatory that the vitamin supplement be encapsulated for protective purposes in exceedingly small spheres or beads of diameters of not more than 2 mm. Whereas each sphere may be of high vitamin potency per unit weight, the very large number required to fortify the feed makes for uniform fortification of the entire feed. It is this problem of protective encapsulation of minute spheres containing the labile, fat-soluble vitamin material with which my aforesaid co-pending application and the present application are concerned.

I have found that the dry, free-flowing, beadlets of the prior art involving encapsulation of vitamin A (one of the more labile members of the fat-soluble vitamin groups) in fats, in waxes, in gelatin or in pectin lack adequate stability when stored in a mineral mixture at 45° C. in a moist environment, viz., about 85% relative humidity. The following mineral mixture has been used in my studies.

| | Grams |
|---|---|
| Manganese sulfate, $MnSO_4 \cdot 4H_2O$ | 74 |
| Potassium iodide, KI | 6 |
| Ferrous sulfate, $FeSO_4 \cdot 4H_2O$ | 73 |
| Copper sulfate, $CuSO_4 \cdot 5H_2O$ | 11 |
| Zinc sulfate, $ZnSO_4 \cdot 7H_2O$ | 4 |
| Cobalt sulfate, $CoSO_4 \cdot H_2O$ | 0.6 |
| Calcium carbonate, Q.S. 20 pounds. | |

When this mixture is supplemented with a few percent of the products of the prior art to provide mixtures containing about 600 USP units of vitamin A per gram, the retention of the vitamin under the conditions of test is poor. The mixtures show a loss of from 50 to 100 percent of the vitamin A at the half-way stage of the storage period, i.e., 10 days at 45° C., the equivalent of 3 months at room temperature.

The destruction of the vitamin D in the products of the prior art also under those conditions, although not as complete as vitamin A, is, however, severe. The mineral mixture fortified with these prior art compositions to an initial potency of 100 USP units of vitamin D per gram show a destruction of that vitamin of from 30 to 60 percent at the end of ten (10) days' storage at 45° C.

In my studies, vitamin A was determined according to the method of H. O. Schaeffer, J.A.O.A.C., volume 33, page 615 (1950), subject to the USP biological assay for confirmatory purposes, and vitamin D by the AOAC chick bone-ash method.

It is to be noted that since mineral supplements are per se indestructible, they are, therefore, stored for much longer periods than other feed supplements prior to use. Suppliers of such supplements to feed manufacturers or to farmers can not tolerate such excessive losses of the costly vitamins. Hence, complete supplements which combine both minerals and vitamins with guaranteed vitamin potencies after extended storage have as yet not been provided by industry.

It is to be noted that mineral supplements contain, in plentiful quantity, the so-called trace minerals, iron and copper, notorious for their influence in promoting the rapid oxidation of both fats and vitamin A. Even if iron and copper salts are not deliberately included as components of some mineral supplements, the other mineral salts furnish, as contaminants, substantial quantities of these essential elements. A good poultry ration will provide about 200 mg. of iron per kilo of ration (200 parts per million), and about 15 mg. of copper per kilo. In the mineral supplement (concentrate) above described, the iron content is actually about 2000 parts per million and the copper content is about 300 parts per million. The manganese concentration is practically the same as that of the iron. I have found that such high concentrations of iron, manganese and copper exert a deleterious effect on fat and on the fat-soluble vitamins, particularly vitamin A. I have noted that as little as 3 parts per million of iron or manganese, or 0.2 part per million of copper markedly affects the resistance of even hydrogenated fats to oxidative deterioration and of the vitamins A, D, E and K contained therein.

In the course of my investigations which led to the present invention, I discovered that it was possible more effectively to stabilize the fat-soluble vitamins, without preparing as an intermediate any of the products of the prior art. That stabilization and protection, I discovered, could be achieved by the creation of dry, discrete spheres or beads of small size, i.e., of about 2 mm. or less in diameter, in which the vitamin is a component of a central core that is encased within an outer protective shell. The central core is a solid fat, the melting point of which, surprisingly, can be substantially below the high melting points that heretofore were sought for. This discovery that lower melting point fats can be used successfully makes it possible to omit emulsifying agents such as lecithin; and also to assure the physiological availability of the vitamin. The outer protective shell is a water-resistant heat-denatured proteinaceous material.

In general, the spheres or beads of the present invention are less than 2 mm. in diameter. They are manufactured by dissolving a vitamin bearing oil or fat-soluble vitamins in the basic molten fat; adding (1) this vitamin-containing fat to (2) an aqueous solution of the proteinaceous material; heating the mixture of (1) plus (2) to a temperature to effect incipient denaturation of the protein; homogenizing the mixture to form an oil-in-water emulsion and spray-drying the emulsion, and at the same time irreversibly denaturing the protein in the outer shell. The resulting product is a mass of tiny spheres containing the fat-soluble vitamins, each sphere being formed of a fatty vitamin-containing cores coated by, or enclosed within, a dry, water-resistant proteinaceous film. The dry vitamin spheres are free flowing, uniform and similar in structure, and will not "oil off" under regular conditions of storage for indefinite periods.

The vitamin bearing oils are fish liver oils, containing vitamin A and/or vitamin D, the synthetic vitamins in an edible oil solvent or in crystalline form—preferably the former because of improved stability prior to formulation, carotene in an edible oil vehicle, vitamin E in an edible oil solvent, and vitamin K in an edible oil vehicle or in crystalline form.

The fat of the central core of the spheres is one in which the fat-soluble vitamins exhibit excellent stability. Contrary to reports in the scientific literature I have discovered that the stability of the vitamins is not necessarily related to the stability of the basic fat component of the spheres. Using the active-oxygen method (A.O.M.) described by King, A. E., Roschen, H. L., and Irwin, W. H., Oil and Soap, volume 10, page 105 (1933), involving aeration of the basic fat components at 98° C., I have obtained the values shown in Table I for oxidative stability.

TABLE I

| Basic Fat Component | Melting Point, ° C. | Iodine Number | Hours to Peroxide Value of 100 me./kg. |
| --- | --- | --- | --- |
| Limpid corn oil |  | 126 | 12. |
| Limpid peanut oil |  | 94 | 25. |
| Hydrogenated cottonseed oil | 35 | 70 | 58. |
| Hydrogenated soybean oil | 43 | 68 | 280. |
| Hydrogenated peanut oil | 45 | 55 | 300. |
| Hydrogenated soybean oil | 50 | 52 | 385. |
| Hydrogenated peanut oil | 49 | 45 | 425. |
| Hydrogenated coconut oil | 37 | 1 | more than 500. |
| Hydrogenated babassu oil | 44 | 1 | more than 500. |

When these oils were used to make the vitamin spheres of this invention, I have obtained the following order of preference in so far as vitamin stability, exemplified by vitamin A stability, is concerned: hydrogenated soybean oil of 50° C. melting point, hydrogenated soybean oil of 43° C. melting point, hydrogenated cottonseed oil, limpid corn oil, hydrogenated peanut oil of 45° C. melting point, limpid peanut oil, hydrogenated babassu oil, and lastly, hydrogenated coconut oil. However, by supplementing some of these basic fats with anti-oxidants which are preferentially soluble in oils, such as butylated hydroxy-anisole to the extent of 0.02 percent of the fat used, the poorer fats are made equal to the best fats as a stabilizing vehicle for vitamin A. The use of the more powerful polyphenols, such as propyl gallate, is of no value in the products of the present invention. Whereas these polyphenols are very effective in stabilizing fats, they do not remain in the basic fat component of my preparations but migrate to, and are found in, the outer proteinaceous shell. In the presence of iron salts in mineral feed mixtures, they impart an objectionable blue discoloration to the vitamin spheres. Likewise, acid stabilizers, such as citric acid, dissolved or dispersed in the basic fat component, migrate to, and are found in, the outer proteinaceous shell. However, advantage has been taken of this apparent disadvantage of citric acid. In such a system there is realized the maximal value of the citric acid by metal sequestration in protecting the inner fat-soluble vitamin against the pro-oxidant effect of the trace minerals migrating into the beadlet in the presence of moisture. When the basic fat components in Table I are supplemented with the phenolic type anti-oxidants such as butylated hydroxyanisole in 0.02 percent concentration, the order of preference for the basic fat components in so far as vitamin A stability is concerned, is directly related to preference based on the active oxygen method (A.O.M.) values listed in Table I.

Vitamin spheres of stability superior to those described by others in this field can be made without the addition of fat-soluble anti-oxidants, but for maximal vitamin retention, particularly when the spheres are mixed with mineral feed mixtures, the addition of the butylated hydroxyanisole is preferred.

Another fact which enters in to the selection of the preferred basic fat components of the present invention is the melting point. I now find that the melting point is far less critical in producing a product which will not "oil off" during ordinary conditions of storage. Indeed, I can now use oils that are liquid at room temperature to form the cores of the spheres. The oil does escape through the proteinaceous shell. However, the spheres should not be subjected to high pressures that will fracture the shell, as in mixing with other ingredients, in packing the products, or in stacking flexible packages containing the vitamin spheres.

I prefer to use fats that are solid at room temperature, and especially those that remain solid at room temperature, after blending with the vitamin oils. When the vitamins in a liquid oil vehicle are added, I prefer to use the hydrogenated fats with a melting point above 45° C. When the vitamins are in crystalline form, or of such high potency that the liquid oil vehicle is negligible in amount (less than three times that of the weight of the vitamin itself), I prefer to use the hydrogenated fats with a melting point of 35° C. to 45° C. In other words, my preference is for a vitamin-basic fat blend with a melting point of 35° to 45° C. With the preferred basic fat components of the present invention, used according to the above scheme, I obtain vitamin spheres which show no oil leakage when held at 45° C. for extended periods, viz., up to three weeks. This surprising finding now makes it unnecessary to use high-melting fats (above 50° C.), and thus unnecessary to add emulsifiers to the vitamin-fat blend to render the vitamin physiologically available for absorption.

The proteinaceous material used in the products of the present invention should contain on the dry basis at least 20 percent of protein that is heat coagulable and completely denatured in aqueous solution at a temperature of 65° C. to 85° C. when the pH of the solution is between 4.0 and 5.0. Proteinaceous material that has already been denatured by heat-processing so that the material is no longer soluble in water, can not be used in making the products of this invention. Solvent-extracted, but not heat-processed soy flour, is a highly satisfactory material to form the outer protective shell that encases the vitamin-fat cores of the spheres. I have also discovered that other proteinaceous materials such as wheat gluten and low-heat skim milk powder (or skim milk) serve also as good proteinaceous sources for coating the vitamin-fat spheres. These materials satisfy the above definition of an acceptable proteinaceous component. Combinations of the proteinaceous materials may be employed. The object is to obtain a tough, water-resistant proteinaceous shell or film around the fat core, i.e., one that does not release the fat component simply on the addition of water. I rely upon the proteolytic enzymes in the digestive tract to solubilize the tough water-insoluble protein film, thereby making the vitamin-fat core available for digestion and absorption.

In making the products of the present invention the proteinaceous material in water solution, in concentrations of from 3 to 10 percent expressed on a protein basis, preferably from 5 to 8 percent, is brought to a temperature of about 10° C. above the melting point of the vitamin oil-basic fat blend.

The fat-soluble vitamin-basic fat blend is prepared separately by dissolving the vitamin oils or synthetic vitamins in the basic fat component held at a temperature of about 10° C. above the melting point of the fat. The aqueous and fat solutions are mixed, preferably under nitrogen, in a tank equipped with a motor-driven propeller agitator to form a coarse oil-in-water emulsion. During the period of agitation of about 10–40 minutes, the mixture is heated to a temperature of from 65° C. to 85° C. The time and temperature of heating can be modified. Usually a 10 minute heating at 85° C. is required to incipiently denature the heat coagulable proteins to the same degree as 40 minutes at 65° C.

I do not however, depend entirely upon this simple ratio to establish the time-temperature relationship for effecting incipient denaturation of the proteins. Small portions, each of about 15 ml., of the coarse oil-in-water emulsion prior to the heating are transferred to 100 ml. test tubes and the latter are then immersed in a series of water baths held at 65°, 70°, 75°, 80° and 85° C. The contents of the test tubes are stirred and examined after 10 minute intervals of time. The maximal heating conditions which still provide a flowable emulsion, in contrast to a non-flowable emulsion or one containing coagulated protein curd in suspension in the case of the next higher member in the series, are selected in heating the bulk emulsion. Thus, if after 30 minutes of heating at 75° C., the test aliquot of emulsion remains flowable, but sets to a non-flowable mass after 30 minutes at 80° C., or after 40 minutes at 75° C., then the bulk emulsion is processed for 30 minutes at 75° C.

As described in my co-pending application, Serial No. 365,788, time and temperature of heating to effect incipient protein denaturation can be substantially reduced when an edible acid, such as citric acid, is added to the proteinaceous aqueous phase prior to the heating; the acid reduces the pH of the aqueous phase bringing it nearer to the isoelectric point of the proteins at which point they are most readily heat coagulated, i.e., rendered irreversibly denatured.

The aqueous-fat mixture with a total solids content of about 30 to 40 percent, water being added if necessary, is cooled to about 55° to 60° C. (to stop further protein denaturation), is then homogenized at a pressure of 2,000 to 4,000 pounds per square inch. This action leads to the formation of a fine oil-in-water emulsion, i.e., very small fat globules dispersed in the continuous proteinaceous aqueous phase. The emulsion is then passed through a high pressure pump necessary to force the emulsion at a pressure of 2,500 to 4,000 pounds per square inch through the nozzles of the spray dryer. I have found the Rogers No. 20 spray dryer of 1200-lb. per hour capacity to be highly satisfactory. Spraying systems' core-type nozzles with removable core and orifice inserts give excellent results. The optimal nozzle opening in the spray-drying operation is about 0.030 inch. The temperature of the incoming hot air ranges preferably between 150° C. to 160° C., and the outgoing air between 80° C. to 85° C. In using the Gray-Jensen dryer, a spray nozzle of about 0.06 inch in diameter is preferred, with the incoming hot air at about 125° C. to 130° C. During the spray-drying operation, the moisture content of the spheres with their shells of denatured protein is reduced to a maximum of 2 percent. An automatic screw-type unloading unit continuously removes the product from the dryer. An astonishing finding in my investigations is that the readily oxidizable vitamins, such as vitamin A, carotene and vitamin E, are destroyed to a negligble degree, despite their very high concentrations. Less than 10 percent losses are noted in the spray-drying operations. It is desirable that the spheres with the vitamin-fat cores and the core-encasing protective shell be quickly removed from the spray-drying chamber and passed through a cooling tunnel. The final product of particle size less than 2 mm. in diameter is sifted and packaged, preferably in a container of structural strength such as a fibre-board drum.

The products of the present invention contain from 40 to 90 percent of the vitamin oil-basic fat component and from 60 to 10 percent of the proteinaceous component. Preferably, the ratio of the inner fat core to the outer protective shell, on a weight basis, is 50–80 parts of the core to 50–20 parts of the shell.

In the manufacture of the vitamin beadlets of this invention, particles of an encasing shell formed of water-resistant, heat-denatured proteinaceous material surrounding a core of fat containing fat-soluble vitamin, I realized on experimentation that the protein denaturation would have to be effected in a two-stage operation. When the coarse oil-in-water emulsion was so processed as to bring about complete protein denaturation, the emulsion could not be forced through the spray nozzle. It then dawned on me that it might be possible incipiently to denature the protein by heating the emulsion to a limited but effective degree, i.e., effective in making the protein more susceptible to irreversibly denaturation (coagulation) during subsequent processing in the course of spray drying the emulsion. Only in this two-stage process could I achieve the objective of fat-soluble vitamin in a fat core surrounded by a shell of water-resistant heat-denatured proteinaceous material; no single step in itself proved adequate.

It will be manifest, therefore, that the inventive concepts discussed herein are (*a*) the discovery that a major cause for the loss of vitamin A in feed supplements is the presence of moisture and of trace minerals and particularly the operation of both of these factors in combination and (*b*) the utilization of water-resistant, heat-denatured digestible protein as a protective barrier against the migration of moisture and moisture that contains dissolved trace minerals into particles containing vitamin A (one of the most labile of the fat-soluble vitamins). This marks a striking departure from all attempts that heretofore have been made to "seal in the vitamin" by the use of either water-soluble coatings or of very high melting fats or waxes.

Another point of emphasis is the concentration of the fat-soluble vitamins in the products of the present invention. These products are concentrates to be employed in the feed industry and contain per pound from about 500,000 to 250 million USP units of vitamin A, 100,000 to 100 million AOAC chick units of vitamin D, and 2500 to 250,000 international units of vitamin E. The high concentrations of these vitamins in my products is apparent when comparing with the maximal vitamin figures for butter fat; the latter contains in one pound at the most about 25,000 USP units of vitamin A, about 500 AOAC units of vitamin D, and practically no vitamin E.

The following are examples of the products of the present invention and describe methods of manufacturing, through a two-stage protein denaturation process, dry discrete beads containing stabilized fat-soluble vitamin in a fatty core which is encased in a heat-denatured, water-resistant, proteinaceous digestible shell.

*Example 1*

In one tank 97.0 parts of coconut oil, hydrogenated to an iodine number of 1.0 and having a melting point of 37° C., is heated to about 47° C. To this are added 0.02 part of butylated hydroxyanisole, 0.025 part of crystalline vitamin $D_3$ of a potency of 40,000,000 AOAC units per gram, and 3.0 parts of vitamin A palmitate in corn oil having a potency of 1,100,000 USP units per gram. The mixture is stirred under nitrogen for a period of about 15 minutes to effect a clear solution.

In another tank 31 parts of solvent-extracted non-heat processed soy flour containing about 50 percent protein (nitrogen×6.25) are suspended in 300 parts of warm water at about 45°–50° C. and stirred for a period of about 15 minutes until the soy flour is dissolved (or finely dispersed).

The contents of the two tanks are mixed under nitrogen to form a coarse oil-in-water emulsion; heated by steam coils to a temperature of about 75° C. for a period of 30 minutes; and then cooled to about 55° to 60° C. to stop further protein denaturation. The aqueous-fat mixture is homogenized at a pressure of 3,000 pounds per square inch to yield a finely dispersed oil-in-water emulsion.

The emulsion containing about 32–33 percent of solids is spray dried as described above to produce dry, discrete beads or spheres (hereinafter referred to as the "final product"). This final product has the physical structure of a vitamin-fat core encased within a protective spherical coating of the water-resistant heat-denatured protein film, the diameter of the spheres measuring less than 2 mm. and the spheres containing less than 1 percent moisture. The ratio of the fatty-vitamin-containing core to the protective coating is as 75:25.

Assays conducted on the final product as thus manufactured indicated a vitamin A content of 10,800,000 USP units per pound (a loss of only 4 percent as a result of the process) and 3,500,000 AOAC units of vitamin $D_3$ per pound (no measurable loss as a result of the process).

When one part of this product is added to 39 parts of the mineral supplement above described, and this mixture of minerals and the vitamin product is stored in a moist environment of about 85% relative humidity at 45° C. for a period of 21 days, fully 85 percent of the vitamin A and all of the vitman $D_3$ are retained, the vitamin A dropping from an initial value of 593 units per gram to 504 units per gram while the vitamin $D_3$ remained constant at about 187 units per gram. In complete feed mixtures made from this final product no measurable losses of the vitamins were noted after the 21 day holding test at 45° C.

In the above and following examples, AOAC units of vitamin $D_3$ are synonymous with internal chick units.

*Example 2*

The materials used are processed in the same way as in Example 1 except that the coarse oil-in-water emulsion is incipiently denatured by heating to a temperature of 85° C. for a period of 10 minutes, and then cooled to less than 60° C. to stop further protein denaturation. The end-product had essentially the same vitamin concentrations and performed equally as well as that of Example 1.

*Example 3*

The materials used are processed in the same way as in Example 1 except that the coarse oil-in-water emulsion is heated to a temperature of 65° C. for a period of 40 minutes to effect incipient protein denaturation and then cooled to 55° C. to stop further protein denaturation. The end-product had essentially the same vitamin concentrations as Example 1, and although still acceptable exhibited somewhat greater vitamin losses when incubated under the same standardized conditions in the test mineral supplement. Retentions of 78 percent of the vitamin A and 95 percent of the vitamin $D_3$ were noted.

*Example 4*

In one tank 83.0 parts of hydrogenated soybean oil, hydrogenated to an iodine number of 52 and having a melting point of 50° C., is heated to about 60° C. To this are added 2.0 parts of vitamin $D_3$ in corn oil (400,000 AOAC units/gram), 10.0 parts of vitamin A in fish liver oil (180,000 USP units/gram), 5.0 parts of vitamin E in cottonseed oil (35 percent mixed tocopherols) and 0.10 part of vitamin K (2-methyl-1,4-naphthoquinone). The mixture is stirred under nitrogen for a period of about 15 minutes to effect a clear solution.

In another tank 100 parts of skim-milk powder (low heat) are suspended in 400 parts of water, and the temperature brought to about 55° C.

The contents of the two tanks are mixed under nitrogen to form a coarse oil-in-water emulsion, heated by steam coils for a period of 30 minutes at a temperature of 80° C., and then cooled to about 55° to 60° C. to stop further protein denaturation. This aqueous-fat mixture is homogenized, as described in Example 1, and spray dried to produce dry discrete spheres in accordance with the method described in Example 1.

The product of this example are spheres having a diameter of less than 2 mm. They are similar in physical structure to the product of Example 1, consisting of a fat-containing vitamin core encased within a protective shell or coating of water-resistant heat-denatured protein. The ratio of the fatty core to the proteinaceous shell is as 50:50.

Assays conducted on the final product of this example indicated the following potencies per pound:

| Vitamin Component | Calculated | Found |
|---|---|---|
| Vitamin A | 4,090,000 USP units | 3,700,000 USP units. |
| Vitamin $D_3$ | 1,820,000 AOAC units | 1,800,000 AOAC units. |
| Vitamin E | 4,000 mg | 4,150 mg. |
| Vitamin K | 227,000 AOAC units | 220,000 AOAC units. |

Vitamins A and $D_3$ were determined by the methods above described. Vitamin E was determined by the colorimetric method for estimation of tocopherols described by H. W. Rawlings, Oil and Soap, vol. XXI, p. 257 (1944). Vitamin K was determined by the blood clotting assay with chicks (Official and Tentative Methods of the AOAC, sixth edition (1945)). With the exception of vitamin A, of which a loss of about 10 percent was experienced, no significant losses of vitamins were noted in the production of the above product. The increase in vitamin E is attributable to the fact that the soybean oil, the fatty component, contributes measurable quantities of tocopherols.

When one part of the product of this example is added to 14 parts of the mineral supplement or concentrate above described, and this mixture of minerals and vitamins is stored in a moist environment of about 85% relative humidity at 45° C. for a period of 21 days, fully 80 percent of the vitamin A and more than 90 percent of the other vitamins were retained after the 21-day holding test at 45° C.

*Example 5*

In one tank, 94.0 parts of hydrogenated babassu oil, hydrogenated to an iodine number of 1.0 and having a melting point of 44° C., is heated to about 55° C. To this are added 0.02 part of butylated hydroxyanisole, 1.0 part of vitamin A acetate concentrate (2,400,000 USP units/gram), 0.015 part of crystalline vitamin $D_3$ (40,000,000 AOAC units/gram), 5.0 parts of vitamin E in cottonseed oil (35 percent mixed tocopherols), and 0.10 part of crystalline vitamin K (2-methyl-1,4-naphthoquinone). The mixture is stirred under nitrogen to effect a clear solution.

In another tank 50.0 parts of solvent-extracted, non-heat processed soybean flour, 41.0 parts of skim-milk powder (low heat) are suspended in 400 parts of warm water and stirred until the soy flour and milk powder are dissolved (or finely dispersed). Then to this solution there are added 1.8 parts of riboflavin, 4.2 parts of niacin, 1.2 parts of calcium pantothenate, 0.0036 part of vitamin $B_{12}$ and the mixture stirred to effectuate solution. The temperature of this solution is raised to about 50° C.

The contents of the two tanks are mixed under nitrogen to form a coarse oil-in-water emulsion, heated by steam coils to a temperature of about 85° C. for a period of 40 minutes, and then cooled to about 55° C. to stop further protein denaturation. This aqueous-fat mixture is homogenized, as described in the foregoing examples to yield an oil-in-water emulsion.

The emulsion is spray-dried as described above to produce dry, discrete beads or spheres having a diameter of less than 2 mm., the spheres being similar in structure to those above described. The ratio of the fatty core to the water-resistant, heat-denatured, protective sphere is as 50:50. The fat-soluble vitamins are present in the cores of said spheres in a highly stable fat containing the added butylated hydroxyanisole which overcomes the deficiency of the base fat in fully protecting the labile, fat-soluble vitamins. Some difficulty was experienced in passing the thick oil-in-water emulsion through the small orifice of the spray nozzle; this problem was solved by including a stainless steel filter in alternate feed lines with pore openings slightly smaller than the clearance in the spray nozzle. As one filter was cleared of some interfering curd, the other line fed the spray nozzle. Because of these processing difficulties, the method described is one of the less-preferred processes. Retention of the fat-soluble vitamins during production of beadlets of this example varied between 90 and 100 percent. During subsequent storage of the spherical bodies as such in the mineral mixture (concentrate), under the standardized conditions described supra, retention of vitamin A was somewhat superior to that noted in the prior examples; fully 92 percent of the vitamin A was retained.

The water-soluble B vitamins are embedded in a heat-denatured, protein matrix that constitutes the encasing shell for the fat cores. These water-soluble vitamins exhibit good stability in that environment, and being carried in diluted form by the beadlets are more readily and uniformly dispersible in feeds.

It will be observed that the instant invention provides a means of making dry, discrete beads containing stabilized fat-soluble vitamin in a fatty core which is encased in a heat denatured, water-resistant proteinaceous digestible shell. The means comprises mixing a solution of fat-soluble vitamin in a fat having a melting point of about at least 35° C., at a temperature of about 10° C. above the melting point of the fat with an aqueous solution of a heat coagulable proteinaceous material; heating the mixture to effectuate incipient denaturation of the protein; homogenizing said mixture containing about 30% to 40% of total solids to form an emulsion with the oil as the finely dispersed internal phase; and spray drying said heated emulsion to effect the second stage of the denaturation, thereby to obtain the aforedescribed beads. As has been stated, the heating of the mixture is carried out to the incipient stage of denaturation, i.e., the protein is but partly denatured so that the mixture is still flowable. The temperature preferably should be at least about 65° C. The length of time required to effectuate the incipient denaturation is readily determined by the simple test above described. Where the temperature is higher, preferably not above 85° C., the time of heating to produce the incipient denaturation is generally shorter than the time which produces the desired incipient denaturation at 65° C. The more extended times at 85° C. may be employed, but this introduces processing difficulties (see Example 5).

The beads provide high concentrations of the fat-soluble vitamins, to wit: per pound of the beads: about 500,000 to 250 million USP units of vitamin A; and may include from 100,000 to 100 million AOAC chick units of vitamin D, and also from 2500 to 250,000 international units of vitamin E. Accordingly, the fat-soluble vitamins are used, when preparing the mixtures, in amounts, with respect to the solids contained therein to provide the aforesaid desired concentrations of said vitamins in the final spray dried products.

I claim:
1. Process of making dry, discrete beads containing stabilized fat-soluble vitamin in a fatty core which is encased in an irreversibly heat-denatured, water-resistant proteinaceous digestible shell, said process comprising mixing a solution of fat-soluble vitamin in a fat having a melting point of about at least 35° C., at a temperature of about 10° C. above the melting point of the fat with an aqueous solution of a heat coagulable, proteinaceous material, heating the mixture to effect incipient denaturation of the protein, the time-temperature relationship for effecting incipient denaturation being determined by heating specimens of said mixture under correlated temperatures and time intervals which show the correlation of time-temperature at which the mixture changes from a flowable mass to a nonflowable mass, homogenizing said mixture to form an emulsion with the oil as the finely dispersed internal phase, and spray drying said heated emulsion to irreversibly denature the protein.

2. Process of making dry, discrete beads containing stabilized fat-soluble vitamin in a fatty core which is encased in an irreversibly heat-denatured, water-resistant proteinaceous digestible shell, said process comprising mixing a solution of fat-soluble vitamin in the fat having a melting point of about at least 35° C., at a temperature of about 10° C. above the melting point of the fat, with an aqueous solution of a heat coagulable, proteinaceous material, heating the mixture to about 65°–85° C. to effect incipient denaturation of the protein, the time-temperature relationship for effecting incipient denaturation being determined by heating specimens of said mixture under correlated temperatures and time intervals which show the correlation of time-temperature at which the mixture changes from a flowable mass to a nonflowable mass, homogenizing said mixture to form an emulsion with the oil as the finely dispersed internal phase, and spray drying said heated emulsion to irreversibly denature the protein.

3. Process of making dry, discrete beads containing stabilized vitamin A in a fatty core which is encased in an irreversibly heat-denatured, water-resistant proteinaceous digestible shell, said process comprising mixing a solution of fat-soluble vitamin in a fat having a melting point of about at least 35° C., at a temperature of about 10° C. above the melting point of the fat with an aqueous solution of a heat coagulable proteinaceous material, the vitamin A being present in an amount of about 500,000 to 250 million USP units of vitamin A per pound of the solids in said mixture, heating the mixture to effect incipient denaturation of the protein, the time-temperature relationship for effecting incipient denaturation being determined by heating specimens of said mixture under correlated temperatures and time intervals which show the correlation of time-temperature at which the mixture changes from a flowable mass to a nonflowable mass, homogenizing said mixture to form an emulsion with the oil as the finely dispersed internal phase, and spray drying said heated emulsion to irreversibly denature the protein.

4. Process in accordance with claim 1, wherein the fat soluble vitamin is vitamin A.

5. Process in accordance with claim 2, wherein the fat soluble vitamin is vitamin A.

6. Dry, discrete beads containing stabilized fat soluble vitamin, said beads being small, discrete, substantially spherical bodies, comprising a fat core containing a fat-soluble vitamin encased within an irreversibly heat-denatured water-resistant proteinaceous digestible shell, said beads being similar to those prepared by the method of claim 1.

7. Dry, discrete beads containing stabilized fat soluble vitamin, said beads being small, discrete, substantially spherical bodies, comprising a fat core containing a fat-soluble vitamin encased within an irreversibly heat-denatured water-resistant proteinaceous digestible shell, said beads being similar to those prepared by the method of claim 1; and wherein the shell constitutes from 60 to 10 percent of the bead and the fat core from 40 to 90 percent thereof.

8. Dry, discrete beads containing stabilized fat-soluble vitamin, said beads being small, discrete, substantially spherical bodies, comprising a fat core containing a fat-soluble vitamin encased within an irreversibly heat-denatured water-resistant proteinaceous digestible shell, said beads being similar to those prepared by the method of claim 2.

9. Dry, discrete beads containing stabilized fat-soluble vitamin, said beads being small, discrete, substantially spherical bodies, comprising a fat core containing a fat-soluble vitamin encased within an irreversibly heat-denatured water-resistant proteinaceous digestible shell, said beads being similar to those prepared by the method of claim 2; and wherein the shell constitutes from 60 to 10 percent of the bead and the fat core from 40 to 90 percent thereof.

10. Dry, discrete beads containing stabilized vitamin A, said beads being small, discrete, substantially spherical bodies, comprising a fat core containing vitamin A encased within an irreversibly heat-denatured water-resistant proteinaceous digestible shell, said beads being similar to those prepared by the method of claim 3.

11. Dry, discrete beads containing stabilized vitamin A, said beads being small, discrete, substantially spherical bodies, comprising a fat core containing vitamin A encased within an irreversibly heat-denatured water-resistant proteinaceous digestible shell, said beads being similar to those prepared by the method of claim 3; and wherein the shell constitutes from 60 to 10 percent of the bead and the fat core from 40 to 90 percent thereof.

References Cited in the file of this patent

UNITED STATES PATENTS

| | | |
|---|---|---|
| 2,650,895 | Wallenmeyer | Sept. 1, 1953 |

FOREIGN PATENTS

| | | |
|---|---|---|
| 297,256 | Great Britain | 1928 |
| 301,651 | Great Britain | 1928 |